United States Patent
Watkinson

(10) Patent No.: US 7,489,630 B2
(45) Date of Patent: Feb. 10, 2009

(54) METHOD AND APPARATUS FOR CONTROLLING CONNECTIONS IN A COMMUNICATION NETWORK

(75) Inventor: David Watkinson, Kanata (CA)

(73) Assignee: Alcatel Lucent, Paris (FR)

( * ) Notice: Subject to any disclaimer, the term of this patent is extended or adjusted under 35 U.S.C. 154(b) by 501 days.

(21) Appl. No.: 11/048,839

(22) Filed: Feb. 2, 2005

(65) Prior Publication Data
US 2006/0171397 A1    Aug. 3, 2006

(51) Int. Cl.
*G01R 31/08* (2006.01)
(52) U.S. Cl. .................................. 370/230; 370/235
(58) Field of Classification Search .................. None
See application file for complete search history.

(56) References Cited

U.S. PATENT DOCUMENTS

| | | | | |
|---|---|---|---|---|
| 5,838,663 | A * | 11/1998 | Elwalid et al. | 370/233 |
| 6,233,223 | B1 * | 5/2001 | Sabry et al. | 370/230 |
| 6,292,466 | B1 * | 9/2001 | Droz | 370/232 |
| 6,496,504 | B1 * | 12/2002 | Malik | 370/390 |
| 6,842,463 | B1 * | 1/2005 | Drwiega et al. | 370/468 |
| 6,956,849 | B1 * | 10/2005 | Yip et al. | 370/359 |
| 6,999,421 | B1 * | 2/2006 | Holzworth et al. | 370/235 |
| 7,010,611 | B1 * | 3/2006 | Wiryaman et al. | 709/232 |
| 7,072,295 | B1 * | 7/2006 | Benson et al. | 370/230 |
| 7,072,304 | B2 * | 7/2006 | Ng et al. | 370/238 |
| 2002/0036981 | A1 * | 3/2002 | Park | 370/230 |
| 2003/0236854 | A1 * | 12/2003 | Rom et al. | 709/217 |
| 2005/0083842 | A1 * | 4/2005 | Yang et al. | 370/230 |
| 2005/0226249 | A1 * | 10/2005 | Moore | 370/395.21 |
| 2006/0050665 | A1 * | 3/2006 | Bruckman | 370/329 |

FOREIGN PATENT DOCUMENTS

EP    1 202 501 A2    5/2002

OTHER PUBLICATIONS

Alagöz, F., et al., "Fixed Versus Adaptive Admission Control in Direct Broadcast Satellite Networks With Return Channel Systems", IEEE Journal on Selected Areas In Communications, vol. 22, No. 2, Feb. 2004, pp. 238-249.

* cited by examiner

*Primary Examiner*—Phirin Sam

(57) ABSTRACT

A method and apparatus are provided for controlling connection to a communication path in a communication network. The apparatus receives a bandwidth request and determines a value of bandwidth expansion factor from information relating to transmission of data over the communication path, which may include the type of channel, the type of connection, the sizes of packet payload and the distribution of the size of packet payload for transmission on the communication path. The actual bandwidth being requested is determined using the bandwidth expansion factor and this information is used by a connection admission controller to allow or deny the requested connection, and/or by a scheduler to control data transmission.

10 Claims, 17 Drawing Sheets

| CHANNEL TYPE - ATM | | | | | |
|---|---|---|---|---|---|
| CONNECTION TYPE | BANDWIDTH EXPANSION FACTOR $f$ (PACKET PAYLOAD) | | | | |
| | BEF (IMIX) | BEF (40BYTE) | BEF (80BYTE) | BEF (USERCONF) | BEF (BC) |
| a (aal5mux) | 1.1717 | 1.325 | 1.325 | $x_1$ | 1.2 |
| b (aal5snap) | 1.2088 | 2.650 | 1.325 | $x_2$ | 1.2 |
| c (LC – ATM, LSP's) | 1.2088 | 2.650 | 1.325 | $x_3$ | 1.2 |
| d (Generic – Labelled LSP's) | 1.2122 | 2.650 | 1.988 | $x_4$ | 1.2 |
| e (Ethernet tunnelled over ATM) | 1.1157 | 1.262 | 1.347 | $x_5$ | 1.2 |

FIG. 2

CHANNEL TYPE: ATM
CONNECTION TYPE: aal5mux

| Packet Size | Size with AAL5 trailer | # cells | bandwidth expansion factor | % of internet mix bandwidth | partial expansion contribution |
|---|---|---|---|---|---|
| A | B = A + 8 | C = 1 + TRUNC((B-1)/48) | D = (Cx53)/A | E | F = ExD |
| 40 | 48 | 1 | 132.5% | 2.73% | 3.62% |
| 44 | 52 | 2 | 240.9% | 0.26% | 0.63% |
| 48 | 56 | 2 | 220.8% | 1.03% | 2.27% |
| 52 | 60 | 2 | 203.8% | 0.45% | 0.92% |
| 60 | 68 | 2 | 176.7% | 0.32% | 0.57% |
| 64 | 72 | 2 | 165.6% | 0.24% | 0.40% |
| 80 | 88 | 2 | 132.5% | 0.51% | 0.68% |
| 576 | 584 | 13 | 119.6% | 20.25% | 24.22% |
| 1000 | 1008 | 21 | 111.3% | 1.65% | 1.84% |
| 1500 | 1508 | 32 | 113.1% | 72.56% | 82.04% |
| INTERNET MIX (overall) expansion factor -> | | | | | 117.17% |

FIG. 4

| CHANNEL TYPE: ATM | | | | | | |
|---|---|---|---|---|---|---|
| CONNECTION TYPE: aal5snap | | | | | | |
| Packet Size | Size with AAL5 trailer | # cells | bandwidth expansion factor | % of internet mix bandwidth | | partial expansion contribution |
| A | B = A+16 | C = 1+TRUNC((B-1)/48) | D = (Cx53)/A | E | | F = ExD |
| 40 | 56 | 2 | 265.0% | 2.73% | | 7.23% |
| 44 | 60 | 2 | 240.9% | 0.26% | | 0.63% |
| 48 | 64 | 2 | 220.8% | 1.03% | | 2.27% |
| 52 | 68 | 2 | 203.8% | 0.45% | | 0.92% |
| 60 | 76 | 2 | 176.7% | 0.32% | | 0.57% |
| 64 | 80 | 2 | 165.6% | 0.24% | | 0.40% |
| 80 | 96 | 2 | 132.5% | 0.51% | | 0.68% |
| 576 | 592 | 13 | 119.6% | 20.25% | | 24.22% |
| 1000 | 1016 | 22 | 116.6% | 1.65% | | 1.92% |
| 1500 | 1516 | 32 | 113.1% | 72.56% | | 82.04% |
| INTERNET MIX (overall) expansion factor -> | | | | | | 120.88% |

FIG. 5

CHANNEL TYPE: ATM
CONNECTION TYPE: LC-ATM LSPs, Transit LSPs on fabric (Null Label+PDU+AAL5)

| Packet Size excl. MPLS Label | Size with AAL5 trailer | # cells | bandwidth expansion factor | % of internet mix bandwidth | partial expansion contribution |
|---|---|---|---|---|---|
| A | B=A+12 | C=1+TRUNC((B-1)/48) | D=(Cx53)/A | E | F=ExD |
| 40 | 52 | 2 | 265.0% | 2.73% | 7.23% |
| 44 | 56 | 2 | 240.9% | 0.26% | 0.63% |
| 48 | 60 | 2 | 220.8% | 1.03% | 2.27% |
| 52 | 64 | 2 | 203.8% | 0.45% | 0.92% |
| 60 | 72 | 2 | 176.7% | 0.32% | 0.57% |
| 64 | 76 | 2 | 165.6% | 0.24% | 0.40% |
| 80 | 92 | 2 | 132.5% | 0.51% | 0.68% |
| 576 | 588 | 13 | 119.6% | 20.25% | 24.22% |
| 1000 | 1012 | 22 | 116.6% | 1.65% | 1.92% |
| 1500 | 1512 | 32 | 113.1% | 72.56% | 82.04% |
| INTERNET MIX (overall) expansion factor -> | | | | | 120.88% |

FIG. 6

| CHANNEL TYPE: ATM | | | | | |
|---|---|---|---|---|---|
| CONNECTION TYPE: Generic-labelled LSPs (LLCSNAP+Label+PDU+AAL5) | | | | | |
| Packet Size excl. MPLS Label | Size with AAL5 trailer | # cells | bandwidth expansion factor | % of internet mix bandwidth | partial expansion contribution |
| A | B = A + 20 | C = 1 + TRUNC((B-1)/48) | D = (Cx53)/A | E | F = ExD |
| 40 | 60 | 2 | 265.0% | 2.73% | 7.23% |
| 44 | 64 | 2 | 240.9% | 0.26% | 0.63% |
| 48 | 68 | 2 | 220.8% | 1.03% | 2.27% |
| 52 | 72 | 2 | 203.8% | 0.45% | 0.92% |
| 60 | 80 | 2 | 176.7% | 0.32% | 0.57% |
| 64 | 84 | 2 | 165.6% | 0.24% | 0.40% |
| 80 | 100 | 3 | 198.8% | 0.51% | 1.01% |
| 576 | 596 | 13 | 119.6% | 20.25% | 24.22% |
| 1000 | 1020 | 22 | 116.6% | 1.65% | 1.92% |
| 1500 | 1520 | 32 | 113.1% | 72.56% | 82.04% |
| INTERNET MIX (overall) expansion factor -> | | | | | 121.22% |

FIG. 7

| CHANNEL TYPE: ATM | | | | | |
|---|---|---|---|---|---|
| CONNECTION TYPE: Ethernet tunnelled over ATM (with LLC/SNAP and GigE DE over ATM Expansion is based on % of GigE port used) | | | | | |
| Payload Size (assuming it is IP) | Size with AAL5 trailer | # cells | bandwidth expansion factor | % of internet mix bandwidth | partial expansion contribution |
| A | B=(A+14+12+8) | C=1+TRUNC((B-1)/48) | D=(Cx53)/(A+38) | E | F=ExD |
| 40 | 74 | 2 | 126.2% | 2.73% | 3.45% |
| 44 | 78 | 2 | 126.2% | 0.26% | 0.33% |
| 48 | 82 | 2 | 123.3% | 1.03% | 1.27% |
| 52 | 86 | 2 | 117.8% | 0.45% | 0.53% |
| 60 | 94 | 2 | 108.2% | 0.32% | 0.35% |
| 64 | 98 | 3 | 155.9% | 0.24% | 0.37% |
| 80 | 114 | 3 | 134.7% | 0.51% | 0.69% |
| 576 | 610 | 13 | 112.2% | 20.25% | 22.72% |
| 1000 | 1034 | 22 | 112.3% | 1.65% | 1.85% |
| 1500 | 1534 | 32 | 110.3% | 72.56% | 80.01% |
| INTERNET MIX (overall) expansion factor -> | | | | | 111.57% |

FIG. 8

| CHANNEL TYPE: POS | | | | |
|---|---|---|---|---|
| CONNECTION TYPE: IP on POS | | | | |
| Packet Size | Size with POS overhead | bandwidth expansion factor | % of internet mix bandwidth | partial expansion contribution |
| A | B=(A+9)×129/128 | D=B/A | E | F=E×D |
| 40 | 49.382813 | 123.5% | 2.73% | 3.37% |
| 44 | 53.414063 | 121.4% | 0.26% | 0.32% |
| 48 | 57.445313 | 119.7% | 1.03% | 1.23% |
| 52 | 61.476563 | 118.2% | 0.45% | 0.53% |
| 60 | 69.539063 | 115.9% | 0.32% | 0.37% |
| 64 | 73.570313 | 115.0% | 0.24% | 0.28% |
| 80 | 89.695313 | 112.1% | 0.51% | 0.57% |
| 576 | 589.57031 | 102.4% | 20.25% | 20.73% |
| 1000 | 1016.8828 | 101.7% | 1.65% | 1.68% |
| 1500 | 1520.7891 | 101.4% | 72.56% | 73.57% |
| INTERNET MIX (overall) expansion factor -> | | | | 102.64% |

| CHANNEL TYPE: POS | | | | | |
|---|---|---|---|---|---|
| CONNECTION TYPE: LSPs on POS | | | | | |
| Packet Size excl. MPLS Label | Size with POS overhead | bandwidth expansion factor | % of internet mix bandwidth | partial expansion contribution | |
| A | B = (A+13)x129/128 | D = B/A | E | F = ExD | |
| 40 | 53.414063 | 133.5% | 2.73% | 3.65% | |
| 44 | 57.445313 | 130.6% | 0.26% | 0.34% | |
| 48 | 61.476563 | 128.1% | 1.03% | 1.32% | |
| 52 | 65.507813 | 126.0% | 0.45% | 0.57% | |
| 60 | 73.570313 | 122.6% | 0.32% | 0.39% | |
| 64 | 77.601563 | 121.3% | 0.24% | 0.29% | |
| 80 | 93.726563 | 117.2% | 0.51% | 0.60% | |
| 576 | 593.60156 | 103.1% | 20.25% | 20.87% | |
| 1000 | 1020.9141 | 102.1% | 1.65% | 1.68% | |
| 1500 | 1524.8203 | 101.7% | 72.56% | 73.76% | |
| INTERNET MIX (overall) expansion factor -> | | | | 103.47% | |

| CHANNEL TYPE: POS | | | | | |
|---|---|---|---|---|---|
| CONNECTION TYPE: ATM/MPLS Frame Mode Relative to configured ATM bandwidth (includes cell header) | | | | | |
| Packet Size | # cells | Size with POS overhead | bandwidth expansion factor | % of internet mix bandwidth | partial expansion contribution |
| A | B = 1 + TRUNC ((A + 7)/48) | C = (Bx48 + 18)x129/128 | D = C/(Bx53) | E | F = ExD |
| 40 | 1 | 66.515625 | 125.5% | 2.73% | 3.43% |
| 44 | 2 | 114.89063 | 108.4% | 0.26% | 0.28% |
| 48 | 2 | 114.89063 | 108.4% | 1.03% | 1.12% |
| 52 | 2 | 114.89063 | 108.4% | 0.45% | 0.49% |
| 60 | 2 | 114.89063 | 108.4% | 0.32% | 0.35% |
| 64 | 2 | 114.89063 | 108.4% | 0.24% | 0.26% |
| 80 | 2 | 114.89063 | 108.4% | 0.51% | 0.55% |
| 576 | 13 | 647.01563 | 93.9% | 20.25% | 19.02% |
| 1000 | 21 | 1034.0156 | 92.9% | 1.65% | 1.53% |
| 1500 | 32 | 1566.1406 | 92.3% | 72.56% | 67.00% |
| INTERNET MIX (overall) expansion factor -> | | | | | 94.03% |

FIG. 11

| ATM/MPLS VP Cell Mode | | | |
|---|---|---|---|
| overall expansion factor -> | | (20+48)*129/128/53 | 129.30% |

FIG. 12

| ATM/MPLS VC Cell Mode | | | |
|---|---|---|---|
| overall expansion factor -> | | (18+48)*129/128/53 | 125.50% |

FIG. 13

CHANNEL TYPE: ETHERNET
CONNECTION TYPE: IP on GigE

| Packet Size | Size with GigE overhead (12 padding, 8 preamble, 18 MAC header) | bandwidth expansion factor | % of internet mix bandwidth | partial expansion contribution |
|---|---|---|---|---|
| A | B = (A + 38) (approximation due to 64 – byte minimum) | D = B/A | E | F = E×D |
| 40 | 84 | 210.0% | 2.73% | 5.73% |
| 44 | 84 | 190.9% | 0.26% | 0.50% |
| 48 | 86 | 179.2% | 1.03% | 1.85% |
| 52 | 90 | 173.1% | 0.45% | 0.78% |
| 60 | 98 | 163.3% | 0.32% | 0.52% |
| 64 | 102 | 159.4% | 0.24% | 0.38% |
| 80 | 118 | 147.5% | 0.51% | 0.75% |
| 576 | 614 | 106.6% | 20.25% | 21.59% |
| 1000 | 1038 | 103.8% | 1.65% | 1.71% |
| 1500 | 1538 | 102.5% | 72.56% | 74.40% |
| INTERNET MIX (overall) expansion factor -> | | | | 108.21% |

FIG. 14

| CHANNEL TYPE: ETHERNET | | | | |
|---|---|---|---|---|
| CONNECTION TYPE: LSPs on GigE | | | | |
| Packet Size excl. MPLS Label | Size with GigE overhead | bandwidth expansion factor | % of internet mix bandwidth | partial expansion contribution |
| A | B = (A + 42) (approximation due to 64 – byte minimum) | D = B/A | E | F = ExD |
| 40 | 84 | 210.0% | 2.73% | 5.73% |
| 44 | 86 | 195.5% | 0.26% | 0.51% |
| 48 | 90 | 187.5% | 1.03% | 1.93% |
| 52 | 94 | 180.8% | 0.45% | 0.81% |
| 60 | 102 | 170.0% | 0.32% | 0.54% |
| 64 | 106 | 165.6% | 0.24% | 0.40% |
| 80 | 122 | 152.5% | 0.51% | 0.78% |
| 576 | 618 | 107.3% | 20.25% | 21.73% |
| 1000 | 1042 | 104.2% | 1.65% | 1.72% |
| 1500 | 1542 | 102.8% | 72.56% | 74.59% |
| INTERNET MIX (overall) expansion factor -> | | | | 108.74% |

FIG. 15

| CHANNEL TYPE: ETHERNET | | | | | |
|---|---|---|---|---|---|
| CONNECTION TYPE: ATM/MPLS Frame Mode on GigE | | | | | |
| Packet Size | # cells | Size with GigE overhead | bandwidth expansion factor | % of internet mix bandwidth | partial expansion contribution |
| A | B = 1 + TRUNC((A+7)/48) | C = (B×48+47) | D = C/(A×53) | E | F = E×D |
| 40 | 1 | 95 | 179.2% | 2.73% | 4.89% |
| 44 | 2 | 143 | 134.9% | 0.26% | 0.35% |
| 48 | 2 | 143 | 134.9% | 1.03% | 1.39% |
| 52 | 2 | 143 | 134.9% | 0.45% | 0.61% |
| 60 | 2 | 143 | 134.9% | 0.32% | 0.43% |
| 64 | 2 | 143 | 134.9% | 0.24% | 0.32% |
| 80 | 2 | 143 | 134.9% | 0.51% | 0.69% |
| 576 | 13 | 671 | 97.4% | 20.25% | 19.72% |
| 1000 | 21 | 1055 | 94.8% | 1.65% | 1.56% |
| 1500 | 32 | 1583 | 93.3% | 72.56% | 67.73% |
| INTERNET MIX (overall) expansion factor -> | | | | | 97.69% |

FIG. 16

| ATM/MPLS VP Cell Mode on GigE | | | |
|---|---|---|---|
| overall expansion factor -> | | (48+38+11)/53 | 183.02% |

FIG. 17

| ATM/MPLS VC Cell Mode on GigE | | | |
|---|---|---|---|
| overall expansion factor -> | | (48+38+9)/53 | 179.25% |

FIG. 18

| CUSTOMER ID | PACKET SIZE DISTRIBUTION |
|---|---|
| A | $Y_A$ |
| B | $Y_B$ |
| C | $Y_C$ |
| D | $Y_D$ |
| E | $Y_E$ |
| F | $Y_F$ |

FIG. 19

METHOD AND APPARATUS FOR CONTROLLING CONNECTIONS IN A COMMUNICATION NETWORK

FIELD OF THE INVENTION

The present invention relates to methods and apparatus for controlling connections in a communication network, and in particular to controlling admission of connections based on requested bandwidth.

BACKGROUND OF THE INVENTION

Communication channels or paths in a communication network typically have a specified maximum bandwidth which limits their capacity to carry traffic. Some types of connections such as MPLS LSPs allow bandwidth to be reserved so that a customer may be guaranteed sufficient bandwidth to transmit data packets at a required rate. Before allowing a requested connection, a connection admission controller determines whether the requested bandwidth is available. The requested bandwidth (which is typically requested in kilobits per second) is based on the anticipated payload, i.e. the data portion of the packets concerned. On receipt of the requested bandwidth, the connection admission controller applies a bandwidth expansion factor to the requested bandwidth to take account of the header portion of the packet which necessarily requires additional bandwidth. The bandwidth expansion factor applied by the connection admission controller is typically a constant value, which for example, is 1.2 for LSPs.

SUMMARY OF THE INVENTION

According to the present invention, there is provided a method of controlling connection to a communication path in a communication network comprising: determining a value of a bandwidth expansion factor based on information relating to transmission of data over the communication path, and controlling at least one of admission and scheduling of said connection using said bandwidth expansion factor.

The inventor has found that parameters relating to transmission of data over a communication path, such as channel type, connection type and packet payload can significantly affect the value of the bandwidth expansion factor. In this method, the bandwidth expansion factor is determined from information relating to transmission of data over the communication path which, advantageously, enables the bandwidth expansion factor for a particular connection to be determined more accurately than hitherto possible.

The information used to determine the bandwidth expansion factor may comprise any one or more of (a) the type of channel associated with the communication path, (b) the type of connection associated with the communication path, (c) one or more sizes of packet payload for transmission on the communication path and (d) the distributions of size of packet payload for transmission on the communication path. The information may comprise other data transmission parameters.

The channel type (which may alternatively be referred to as "port type") is typically the protocol used by the layer at which packetization occurs, i.e. the layer at which bytes of data are grouped into packets. Examples of channel (or port) type include but are not limited to ATM (asynchronous transfer mode), POS (Packet-over-Sonet) and Ethernet.

Connection type typically refers to the type of signaling or signaling protocol used for routing data through a communication network. The connection type is typically constant (i.e. does not vary) from one end of a connection to another, (i.e. between source and destination). The type of connection may be configured by the network management system or may be determined locally by the source end of the connection, for example. Examples of connection types include, but are not limited to, PVC (permanent virtual circuit) or SPVC, generic-labelled LSP (label switched path), LC-ATM LSP (Label Controlled-ATM LSP), IP (internet protocol) pseudo-wire, Ethernet pseudo-wire, ATM pseudo-wire, frame mode mediation, VC (virtual connection) cell mode mediation and other mediation types.

In addition to channel and connection type, it has been found that the size of packet payload can also significantly influence the bandwidth expansion factor. Embodiments of the present invention determine a value of bandwidth expansion factor based on the size of packet payload or on two or more sizes of packet payload if the size of payload varies, and the traffic therefore contains a combination of data packets having different sized payloads.

In embodiments of the present invention, the bandwidth expansion factor may be determined based on the distribution of size of packet payload for transmission on the communication path. In this case, the proportion or relative number of data packets having a payload of a particular size within the traffic is used to determine the bandwidth expansion factor. Advantageously, this allows the bandwidth expansion factor to be tailored to a particular requested connection and/or a particular customer depending on the distribution of payload sizes required and envisaged for the connection.

In one embodiment, the bandwidth expansion factor may be selected from a plurality of pre-calculated values contained in a table.

Also according to the present invention, there is provided an apparatus for controlling connection to a communication path in a communication network comprising: determining means for determining a value of a bandwidth expansion factor based on information relating to transmission of data over the communication path, and control means for controlling at least one of admission of said connection using said bandwidth expansion factor, and scheduling of said connection using said bandwidth expansion factor.

In one embodiment, the information comprises at least one of (a) the type of channel associated with the communication path, (b) the type of connection associated with the communication path, (c) one or more sizes of packet payload for transmission on the communication path, and (d) the distribution of size of packet payload for transmission on the communication path.

The determining means may be adapted to select a precalculated value of bandwidth expansion factor from a table containing a plurality of precalculated values, and the apparatus may further comprise storage means for storing the table.

The table may include values of bandwidth expansion factor that are based on different variants of at least one characteristic relating to transmission of data over the communication path, and the table may include different variants based on at least two, or at least three characteristics relating to transmission of data over the communication path.

In one embodiment, the table includes at least one value of a bandwidth expansion factor for traffic containing data packets having different sizes of payload. The bandwidth expansion factor may be determined by (1) determining a bandwidth expansion factor for each size of packet, (2) for each different size packet, determining the product of the expansion factor and the proportion of packets of each packet size in the traffic and (3) summing the products to provide the bandwidth expansion factor.

The apparatus may further comprise determining means, responsive to a bandwidth or connection request for determining information relating to transmission of data over the communication path, such as the type of channel associated with the communication path, the type of connection, one or more sizes of packet payload for transmission on the communication path and/or the distribution of the size of packet payload for transmission on the communication path. The determining means may determine such information from the bandwidth request or connection request or from another source.

According to the present invention, there is further provided a data structure comprising a plurality of values, each value based on a bandwidth expansion factor, wherein each bandwidth expansion factor is based on a different variant of a characteristic relating to transmission of data over a communication path.

In one embodiment, the data structure further comprises at least one of (a) an indication of a characteristic relating to the transmission of data over the communication path and (b) associated with each value, an indication of the variant of the characteristic on which the value is based.

The variants of the characteristic may comprise different values of packet size, different distributions of packet sizes, different types of connection associated with the communication path and/or different channels associated with the communication path.

In one embodiment, the data structure may comprise at least one value of a bandwidth expansion factor for traffic containing a combination of data packets containing different sizes of payload. The bandwidth expansion factor for the combination of different size packets may be determined by (1) determining a bandwidth expansion factor for each size of packet, for each different packet size, determining the product of the expansion factor and the proportion of packets of each packet size in the traffic, and summing the products to provide the bandwidth expansion factor.

Also according to the present invention, there is provided a method of controlling connection to a communication path in a communication network comprising: determining a value of a bandwidth expansion factor based on information relating to transmission of data over the communication path, and controlling connection to a communication path using said bandwidth expansion factor.

Also according to the present invention, there is provided an apparatus for controlling connection to a communication path in a communication network comprising: determining means for determining a value of a bandwidth expansion factor based on information relating to transmission of data over the communication path, and control means for controlling connection to said communication path using said bandwidth expansion factor.

Also according to the present invention, there is provided a method of determining at least one bandwidth expansion factor comprising the steps of determining the size of space required to accommodate a data packet including payload and transmission overhead based on at least one data transmission parameter for the data packet and determining the ratio of the determined space and the size of payload.

In one embodiment, the data transmission parameter comprises any one or more of channel type, connection type, size of payload and distribution of packet payload sizes.

BRIEF DESCRIPTION OF DRAWINGS

Examples of embodiments of the present invention will now be described with reference to the drawings, in which:

FIG. 2 shows an example of a table of bandwidth expansion factors according to an embodiment of the present invention;

FIGS. 4 to 18 show examples of methods used to calculate the tables of bandwidth expansion factors according to embodiments of the present invention, and FIG. 19 shows a table of customer usage data associated with transmission of data over a connection, according to an embodiment of the present invention.

DETAILED DESCRIPTION OF EMBODIMENTS

Figure 1:
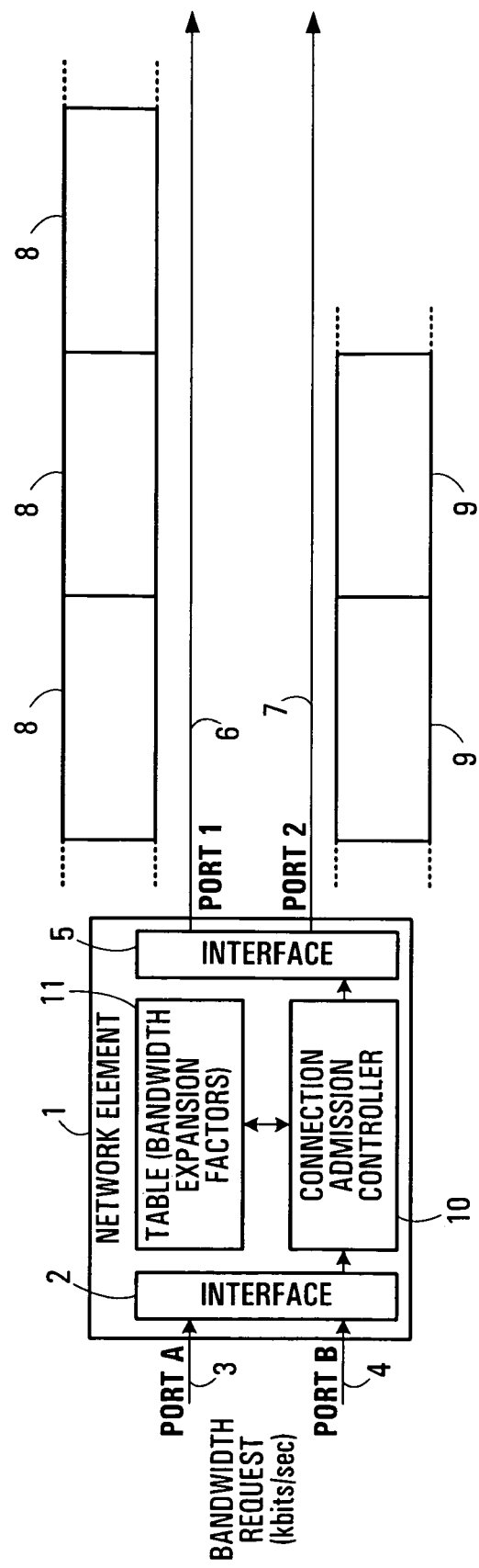
FIG. 1 shows a connection admission controller according to an embodiment of the present invention.

Referring to FIG. 1, a network element 1 according to an embodiment of the present invention comprises a first communication interface 2 having a plurality of communication ports 3, 4 for receiving data packets, a second communication interface 5 having a plurality of communication ports 6, 7, for transmitting data packets 8, 9, a connection admission controller 10 and a table 11 containing bandwidth expansion factors (BEFs). The network element 1 is adapted to receive connection requests and an indication of the required bandwidth associated with the request. Bandwidth requests may be received via ports of a communication interface of the network element or via any other receiving device. Requested bandwidths are typically only based on the payload or data portion of data packets and do not take account of the size of the packet header, which may vary depending on data transmission parameters such as channel type, connection type and distribution of packet sizes of the payload.

The connection admission controller 10 determines from the table 11 a value of bandwidth expansion factor for a requested connection based on one or more data transmission parameters. The connection admission controller then determines the real bandwidth that needs to be allocated to the requested connection by multiplying the requested bandwidth by the determined bandwidth expansion factor, and then determines whether any one of the network element egress ports has sufficient bandwidth to accommodate the connection. This may be performed by examining its records of bandwidth already allocated to each port and determining whether or not the additional bandwidth would cause the maximum bandwidth for that port to be exceeded. Alternatively, or in addition, the connection admission controller may determine whether the required bandwidth can be accommodated by connections from two or more ports, rather than from a single port, and this methodology may be invoked if no single port has sufficient bandwidth for the requested connection. Generally, if the connection admission controller determines that one or more ports has sufficient bandwidth, the connection is allowed, otherwise the connection is denied.

FIG. 2 shows an example of a table of predetermined bandwidth expansion factors 11 which may be stored in the network element 1 of FIG. 1 and used by the connection admission controller 10 to determine whether to permit requested connections. The bandwidth expansion factors are pre-calculated as a function of channel type, connection type, raw payload size and distribution of packet sizes of the packet payload. In this embodiment, the channel type is ATM (Asynchronous Transfer Mode), and the table contains bandwidth expansion factors for five different packet payload sizes for each of five different connection types a to e. The different sizes of packet payload are "Internet Mix" (which contains a plurality of different size packets), forty byte packets (which are typically employed for laboratory type testing), eighty byte packets (which may typically be employed in Voice-over-Internet Protocol applications), a user configurable bandwidth expansion factor, and a "Backwards Compatible" (BC) bandwidth expansion factor which corresponds to the value previously employed by the connection admission controller to calculate an appropriate value of the real bandwidth required for requested connections before the bandwidth expansion factor table is downloaded and implemented by the connection admission controller. Advantageously, including the Backwards Compatible BEF values in the table allows the original functionality of the connection admission controller to be preserved, and used as required after the table has been downloaded.

In this embodiment, for each payload packet size, the table includes BEF values for five different connection types, namely (a) AAL5MUX for carrying IP (Internet Protocol) packets directly over the AAL5 protocol; (b) AAL5SNAP for carrying IP packets over the LLC/SNAP (Logical Link Control/SubNetwork Attachment Point) over AAL5; (c) LC-ATM LSPs (Label Controlled—ATM Label Switched Path) for carrying MPLS-encapsulated (Multi Protocol Label Switch) packets using VPI/VCI (virtual path identifier/virtual connection identifier) as the label; (d) generic-labelled LSPs for carrying MPLS-encapsulated packets using a shim header as the label; and (e) Ethernet tunnelled over ATM for carrying Ethernet packets over an ATM VC. It will be appreciated that in other embodiments, the table may include fewer or more connection types, as well as different connection types to those included in the example of FIG. 2. Similarly, other tables may include fewer or more packet payload sizes and/or distributions and other tables may include bandwidth expansion factors for one or more different values of payload sizes and/or distributions to those provided in the table of FIG. 2.

In ATM, data is transmitted in a contiguous series of cells in which each cell has the same fixed length of typically fifty-three bytes. Each data packet is confined to a whole number of complete cells, and since data packets can vary widely in length and may not fully occupy a whole number of cells, one cell may be partially empty, and the amount by which this cell is unoccupied by the data packet depends on the data packet size.

For ATM, embodiments of the present invention determine the bandwidth expansion factor by first determining the complete packet size, i.e. raw payload plus header/trailer and secondly by determining the ratio of total number bytes (the number of cells times cell byte size) required to accommodate the complete packet to the size of payload in the packet.

Figure 3:
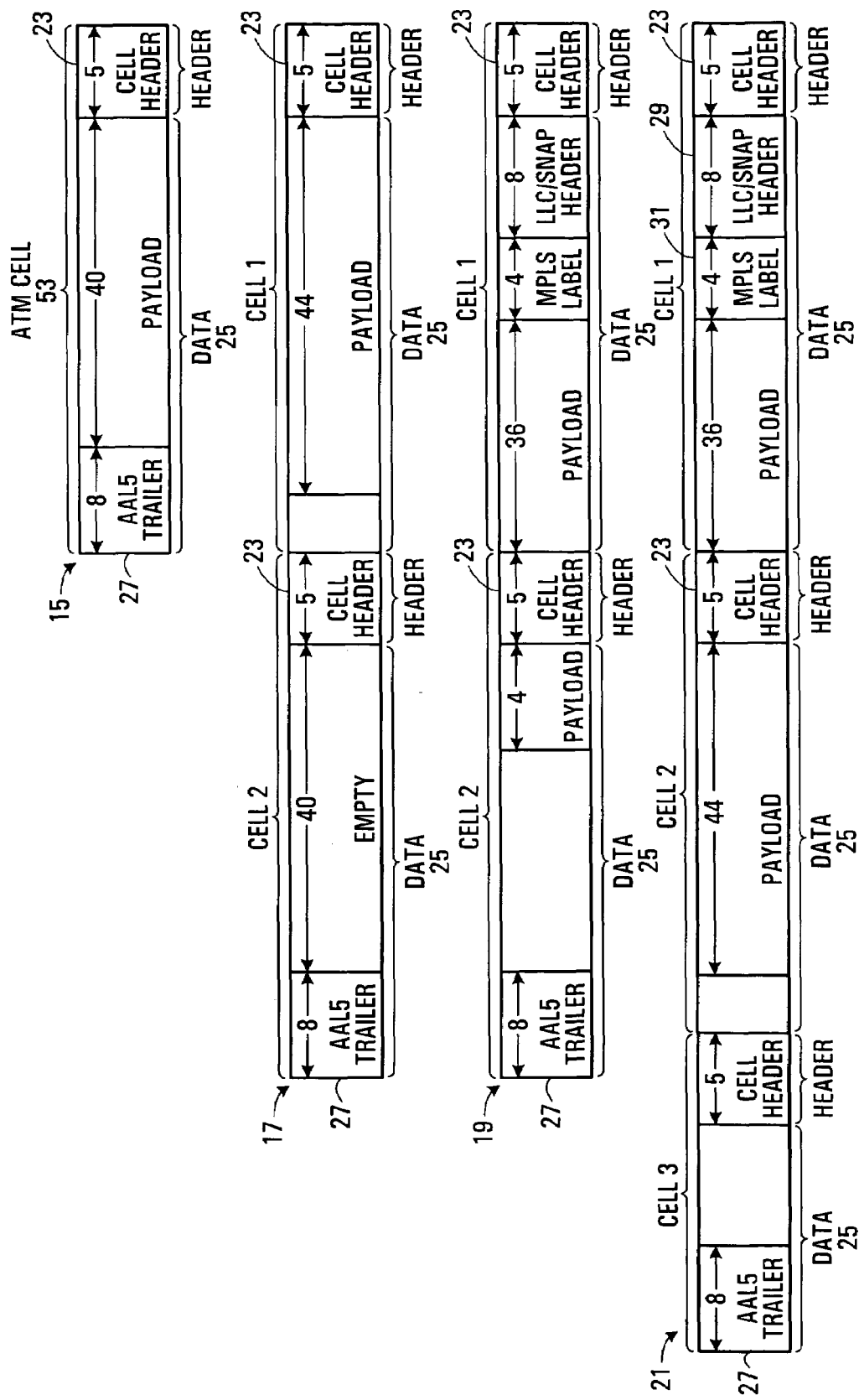
FIG. 3 shows examples of data packets of different types accommodated in ATM cells.

By way of example, FIG. 3 shows four data packets 15, 17, 19 and 21 for transmission over ATM, and illustrate how the bandwidth expansion factor varies depending on packet size and connection type. ATM cells each have a total length of 53 bytes, which includes a 5 byte cell header 23 (which specifies VCP/VCI (virtual path identifier/virtual connection identifier) information) and a 48 byte data portion 25. For the first and second packets, 15, 17, the connection type is AAL5MUX, which requires an eight byte trailer 27 at the end of the ATM cell. The trailer 27 included in the data portion 25, and the trailer size is independent of the size of payload. The first packet 15 has a payload size of 40 bytes and the complete packet size (i.e. the data portion excluding cell header) is therefore 48 bytes. As this is the same size as the data portion of an ATM cell, the complete packet can be accommodated in a single cell. In this case, the bandwidth expansion factor is the number of cells required to accommodate a complete data packet times the cell size divided by the payload size which equals: 1 ×53/40=1.325, or expressed as a percentage: 132.5%.

The payload size of the second data packet 17 is 44 bytes and the complete packet size is therefore 52 bytes with a trailer size of 8 bytes. Therefore, the second data packet requires two ATM cells and leaves four bytes of the first cell and forty bytes of the second cell unoccupied. Accordingly, the bandwidth expansion factor for the second data packet 17 is: 2×53/52=2.409 or 240.9%. This is a significant increase of 182% of the BEF for the first data packet 15, although the payload size has only increased by 110%.

For the third and fourth data packets 19 and 21, the connection type is generic-labelled LSP which requires 8 bytes for the LLC/SNAP header 29 and 4 bytes for the MPLS label 31, and their sizes are both independent of the payload size. The third data packet 19 has a payload size of 40 bytes and a complete packet size of 60 bytes which therefore requires two ATM cells, with the first cell containing 36 bytes of the payload, the second cell containing 4 bytes of the payload leaving 36 bytes of the second-cell empty. In this case, the bandwidth expansion factor for the third data packet 19 is 2.65 or 265%.

The fourth data packet 21 has a payload size of 80 bytes and a total size of 100 bytes (including AAL5 trailer 27, the LLC/SNAP header 29 and the MPLS label 31) and therefore requires three ATM cells. The bandwidth expansion factor for the fourth data packet is: 3 ×100/80=1.988 or 198.8%.

The examples above illustrate that the bandwidth expansion factor can vary widely depending on both the payload size and the connection type, and can substantially exceed the estimated value of 1.2 for LSPs, used conventionally.

FIGS. 4 to 18 show tables of precalculated values of Bandwidth Expansion Factors, and any values from these tables may be used by embodiments of the present invention to determine more accurately the real bandwidth associated with a bandwidth request. These tables are described in more detail below.

FIGS. 4 to 8 show examples of tables of precalculated bandwidth expansion factors for a range of different payload sizes of between forty and fifteen hundred bytes. Each table also indicates a precalculated value of bandwidth expansion factor for an internet mix of packet sizes. For each table, the channel type is ATM, and each table is calculated for a particular connection type. In particular, the connection type for the table of FIG. 4 is AAL5MUX, the connection type for FIG. 5 is AAL5SNAP, the connection type for FIG. 6 is LC-ATM LSP, the connection type for the table of FIG. 7 is generic-labelled LSP and the connection type for FIG. 8 is Ethernet tunnelled over ATM.

Referring to the table of FIG. 4, the first column on the left-hand side contains values of (raw) payload size (A) in bytes and the second column contains the packet size (B) which is the sum of the raw payload plus header/trailer (in this case the size of the AAL5 trailer), which has a constant value of eight bytes, independent of the payload size.

The number of ATM cells required to accommodate a packet of a predetermined size is calculated according to the equation:

$$C = 1 + \text{trunc}((B-1)/48)$$

This equation determines the number of cells by rounding up the number of bytes B subtracted by 1 divided by 48. Thus, for a value for B of 48, C will be 1. For a value for B of 49, C will be 2.

The required number of cells (C) for each packet is indicated in column 3.

The bandwidth expansion factor (BEF) for each packet size is determined from the equation $D=C\times53/A$ and is expressed as a percentage in column 4. The number of cells is multiplied by 53 to give the number of bytes being transmitted. This is divided by the payload packet size, A, to give the BEF.

Column 5 indicates the percentage of bandwidth (E) taken up by packets of each size according to an Internet Mix, and these weighting values are based on actual studies of internet traffic.

The partial bandwidth expansion contribution (F) for each packet size in the internet mix is calculated as the product of the bandwidth expansion factor D and the percentage of internet mix bandwidth E, and these values are indicated in column 6.

The internet mix bandwidth expansion factor is calculated as the sum of the partial bandwidth expansion contributions (F) (i.e. the sum of the values in column 6) and is shown as the figure under column 6, which in FIG. 4 is 117.17%.

The tables of FIGS. 5 to 8 are determined in a similar manner to that described above in connection with the table of FIG. 4. The main difference between each table is that the packet header size varies depending on the connection type and this ultimately affects the calculated bandwidth expansion factor.

For connection type AAL5SNAP, as shown in FIG. 5, the header and trailer sizes add up to sixteen bytes; for connection type LC-ATM LSP (FIG. 6), the header and trailer size is twelve bytes; for the connection type generic-labelled LSP (FIG. 7), the header and trailer size is twenty bytes, and for connection type Ethernet tunnelled over ATM, as shown in FIG. 8, the header size is thirty-four bytes.

Note that in FIG. 8, an alternative equation: $D=(C\times53)/(A+38)$ is used to determine the bandwidth expansion factor, to account of the Layer 2 nature of these connections. The payload is assumed to include the 38 bytes of Ethernet overhead in the packet. The connection requests for these services would have a bandwidth request that includes the Ethernet overhead.

The variation in header size affects the total packet size which in turn affects the number of cells (C) required to accommodate each packet as calculated in column 3, and the bandwidth expansion factor, as determined in column 4 of each table.

The table of FIG. 2 is derived from values contained in the Tables of FIGS. 4 to 8.

FIGS. 9 to 13 show examples of tables of bandwidth expansion factors calculated for different packet sizes where the channel type is "Packet-over-Sonet" (POS), and each table is calculated for a different connection type.

Referring to the table of FIG. 9 which is calculated for connection type IP on Packet-over-Sonet, the first column on the left-hand side contains a range of values of payload size (A), and the second column contains values of the packet size (B) including payload plus POS overhead. The packet size is calculated from the equation $B=(A+9)\times129/128$, where 9 is the number of bytes in the header, and the fraction 129/128 takes account of the byte stuffing. The byte stuffing fraction arises as there are two byte values that cause an additional byte to be inserted in the transmission. This results in a 2/256 chance that an additional byte will be inserted, and thus a 129/128 bandwidth expansion.

The bandwidth expansion factor (D) is then calculated as the ratio of total packet size over payload size and is expressed as a percentage in column 3. As for the tables of FIGS. 4 to 8, the internet mix expansion factor is determined from the percentage of bandwidth taken up by packets of each size (E), as indicated in the fourth column, and the partial bandwidth expansion contribution of each packet (F) is determined as the product of bandwidth expansion factor (D) and percentage of internet mix bandwidth (E), as shown in column 5.

The bandwidth expansion factor values and internet mix bandwidth expansion factors of the tables of FIGS. 10 and 11 are calculated in a similar manner to those of FIG. 9.

The header size depends on the type of connection and significantly affects the calculated bandwidth expansion factor. In the table of FIG. 10, the connection is LSP on POS and the header is thirteen bytes long.

In the table of FIG. 11, the connection type is ATM/MPLS frame mode which is a cell-based data transmission methodology. In calculating the bandwidth expansion factor, the number of cells (C) needed to accommodate a packet of a predetermined size is first determined from the equation: $B=1+\text{trunc}((A+7)/48)$, where the number of bytes in the header is eight. This number is decremented to seven to make the rounding calculation give the correct number of cells.

The total packet size including POS overhead is then calculated from the equation $C=(B\times48+18)\times129/128$. Since only the data portion of the cells is carried inside the ATM/MPLS Mediation frame, the number of cells (B) is multiplied by 48. These frames have a 9 byte header in addition to the standard 9 byte POS header resulting in the 18 bytes of addition in the equation. The byte stuffing is taken into account by the factor 129/128. The bandwidth expansion factor (D) is then determined as the ratio of total packet size over the payload size, and the bandwidth expansion factor values are contained in the fourth column. The bandwidth expansion factor for internet mix is determined in a similar manner described above in connection with the tables of FIGS. 4 to 9.

For a connection type ATM/MPLS VP cell mode, the overall expansion factor may be calculated from the expression $(20+48)\times129/128/53=129.30\%$, as shown in FIG. 12, and for a connection type ATM/MPLS VC cell mode, the overall expansion factor can be calculated from the expression $(18+48)\times129/128/53=125.5\%$, as shown in FIG. 13. The bandwidth expansion factor is independent of packet size as these ATM/MPLS Mediation frames only carry single ATM cells. The VP cell mode has an overhead of 20 bytes, a payload of 48 bytes, and a byte stuffing factor of 129/128. The VC cell mode has an overhead of 18 bytes, a payload of 48 bytes and a byte stuffing factor of 129/128.

FIGS. 14 to 18 show tables of bandwidth expansion factors calculated for different packet sizes, where the channel type is Ethernet and each table is calculated for a different connection type.

Referring to FIG. 14, in which the connection type is IP on GigE (Gigabit Ethernet), the total packet size (B) is first calculated as the sum of the payload (A) and a GigE overhead of thirty-eight bytes. The overhead comprises twelve bytes of padding, an eight byte preamble and an eighteen byte MAC (Media Access Control) header.

The first two values for payloads of 40 and 44 bytes are rounded up to a minimum size of 64 bytes (without padding or preamble but including MAC header) according to the Ethernet specification, and are therefore calculated as $B=64+12$ (padding)$+8$(preamble). The values of the total packet size with Ethernet overhead are contained in column 2. The bandwidth expansion factor is calculated as the ratio of total packet size (B) to payload size (A) and the results are shown in column 3. The bandwidth expansion factor for internet mix is also shown in the table and is calculated in the manner described above.

The table of FIG. 15 is calculated for a connection type LSP on GigE. The total packet size (B) including GigE overhead is calculated as the sum of the payload (A) and 42 bytes which is comprised of the 38 bytes mentioned above and a 4 byte MPLS label, and the values of B are contained in column 2. The first value is rounded up due to a minimum size (without padding or preamble, but including MAC header and MPLS label) of sixty-four bytes. Again, the bandwidth expansion factor (D) is determined as the ratio of total packet size to payload size and the values are contained in column 3. The bandwidth expansion factor for internet mix is also shown in the table of FIG. 16 and is calculated in the manner described above.

The table of FIG. 16 is calculated for a connection type ATM/MPLS frame mode on GigE which concatenates the data portion of cells together.

Firstly, the number of cells (B) required to accommodate a packet is determined from the equation: B=1+trunc((A+7)/48), and the number of required cells for each payload size is contained in column 2. This is the same equation as used in FIG. 11.

Next, the packet size with GigE overhead is determined from the equation: C=((B×48)+47), and the packet size (C) for each payload is contained in column 3. The number 47 consists of the standard 38 bytes of Ethernet overhead and an additional 9 bytes for the ATM/MPLS Mediation header.

The bandwidth expansion factor (D) is then calculated from the ratio of packet size (C) with GigE overhead to the payload size (A), and the bandwidth expansion factors are shown in column 4.

The table of FIG. 16 also indicates the bandwidth expansion factor for internet mix which is calculated in the manner described above.

The bandwidth expansion factor has also been calculated for connection type ATM/MPLS VP cell mode on GigE and also for connection type ATM/MPLS VC cell mode on GigE and these values are shown in FIGS. 17 and 18, respectively. The 48 bytes of payload are accompanied by the 38 byte Ethernet overhead and an additional 11 bytes for VP cell mode and 9 bytes for VC cell mode overhead for the ATM/MPLS Mediation header.

As can be seen from the tables of FIGS. 4 to 18, the bandwidth expansion factor can vary widely depending on channel type, connection type and payload size. Advantageously, embodiments of the connection admission controller apply the appropriate bandwidth expansion factor to the requested bandwidth as determined from any one or more of channel type, connection type and packet size, so that the real bandwidth required is more accurately determined than previously possible using a single value which is insensitive to variations in these data transmission parameters. This increases the confidence in the decisions made by the connection admission controller and assists a provider in guaranteeing the availability of sufficient bandwidth and quality of service (QoS).

In order to select an appropriate bandwidth expansion factor for a given bandwidth request, the connection admission controller requires knowledge of the data transmission parameter(s) associated with the connection for which the bandwidth is being requested, and the transmission parameter(s) can be obtained or derived from any suitable source and using any suitable technique.

In one embodiment, the service provider may store information relating to one or more data transmission parameters for each customer. When a customer requests additional bandwidth, the request identifies the customer and the stored information about the customer's transmission parameter(s) is used by the connection admission controller to look-up or select the appropriate bandwidth expansion factor. The data transmission parameter(s) for each customer may be stored and provided by the service provider network management system and/or stored in one or more network elements. An example of a Table containing transmission parameters for different customers is shown in FIG. 19. In this Table, the left hand column contains an indication of each customer ID and the right hand column contains information regarding packet size distribution, associated with each customer. One or more data transmission parameters may be obtained directly from the initial agreement between the customer and service provider, i.e. when the customer first becomes a new customer of the service provider and acquires a connection.

Alternatively, one or more data transmission parameters may be derived indirectly by detecting characteristics of data packets transmitted by a customer. For example, service provider equipment, such as a network element, may examine and derive information about one or more transmission parameters from the packet header. Alternatively, or in addition, the service provider equipment, such as a network element, may examine characteristics of the payload and derive information about the payload, such as its size. This derived information may be stored by the service provider, for example in the network element, for use by the connection admission controller in selecting an appropriate bandwidth expansion factor when it receives a bandwidth request.

In another embodiment, one or more transmission parameters may be specified by the customer and explicitly contained in the bandwidth request or in another signal associated with the request. In this case, the information may typically be contained within the payload of the bandwidth request or signal associated therewith, and the payload data is read by the service provider equipment to which the request is directed and used by the appropriate connection admission controller to select the appropriate bandwidth expansion factor.

Bandwidth requests may comprise requests for permanent or static connections, or so-called "on-command connections" which have a limited time duration.

In one embodiment, one or more data transmission parameters for one or more customers are stored in the network management system or Operations Support System (OSS). When a network element receives a bandwidth request, the network element may be adapted to signal to the network management system a request for one or more bandwidth parameters for a customer to enable a network element to select the appropriate bandwidth expansion factor. On receiving the request, the network management system transmits the requested parameters to the network element which then uses the information to select the appropriate bandwidth expansion factor from one or more tables of bandwidth expansion factors stored therein, for subsequent use by the connection admission controller.

Any communications system may be used to pass transmission parameter requests and data between one or more network elements and the network management system, and in one embodiment, the communications system may comprise a virtual private network which links the network management system to each network element and possibly also interconnects different network elements directly, i.e. without the connections passing via the network management system.

In other embodiments, the bandwidth expansion factor may be determined by means other than a connection admission controller. If a connection admission controller is present, the determining means may provide the bandwidth expansion factor to the admission controller and/or the admission controller may be provided with the value of requested bandwidth after the bandwidth expansion factor has been applied. The connection admission controller is typically implemented in software although it may be implemented in hardware.

In other embodiments, the bandwidth expansion factor and/or the requested bandwidth determined from the BEF may be provided to a scheduler for scheduling the transmission of data. For example, in the embodiment of the network element of FIG. 1, the connection admission controller may be replaced by a scheduler, or the network element may include both a connection admission controller and a scheduler. The means for determining the BEF and/or the actual requested bandwidth (after the BEF has been applied) may be separate from the admission controller and/or the scheduler. The BEF/bandwidth determining means may be implemented in any desired manner, for example in software or hardware or a combination.

Modifications and changes to the embodiments described above will be apparent to those skilled in the art.

The invention claimed is:

1. A method of controlling connection to a communication path in a communication network comprising:
   determining a value of a bandwidth expansion factor based on information relating to a parameter of transmission of data over the communication path, and
   controlling at least one of admission of said connection using said bandwidth expansion factor, and scheduling of said connection using said bandwidth expansion factor,
   wherein said parameter comprises at least one of (a) the type of channel associated with said communication path, (b) the type of connection associated with said communication path, (c) one or more sizes of packet payload for transmission on said communication path, and (d) the distribution of size of packet payload for transmission on said communication path.

2. A method as claimed in claim 1, wherein the step of determining comprises selecting a precalculated value of said bandwidth expansion factor from a table containing a plurality of precalculated values.

3. A method of controlling connection to a communication path in a communication network comprising:
   determining a value of a bandwidth expansion factor based on information relating to a parameter of transmission of data over the communication path,
   controlling at least one of admission of said connection using said bandwidth expansion factor, and scheduling of said connection using said bandwidth expansion factor,
   determining a value of a bandwidth for said connection based on said determined bandwidth expansion factor,
   wherein the step of determining a value of bandwidth comprises multiplying the bandwidth expansion factor by requested bandwidth for the connection.

4. A method of controlling connection to a communication path in a communication network comprising:
   determining a value of a bandwidth expansion factor based on information relating to a parameter of transmission of data over the communication path, and
   controlling at least one of admission of said connection using said bandwidth expansion factor, and scheduling of said connection using said bandwidth expansion factor,
   wherein the step of controlling admission comprises at least one of (a) permitting admission of said connection if a bandwidth determined from said bandwidth expansion factor is below a predetermined value, and (b) denying admission of said connection if a bandwidth determined from said bandwidth expansion factor is above a predetermined value.

5. A method as claimed in claim 1, further comprising receiving a request for at least one of a connection and bandwidth, and determining at least part of said information relating to a parameter of transmission of data over the communication path from information contained in said request.

6. An apparatus for controlling connection to a communication path in a communication network comprising:
   determining means for determining a value of a bandwidth expansion factor based on information relating to a parameter of transmission of data over the communication path, and
   control means for controlling at least one of admission and scheduling of said connection using said bandwidth expansion factor,
   wherein said parameter comprises at least one of (a) the type of channel associated with said communication path, (b) the type of connection associated with said communication path, (c) one or more sizes of packet payload for transmission on said communication path, and (d) the distribution of size of packet payload for transmission on said communication path.

7. An apparatus as claimed in claim 6, wherein said determining means is adapted to select a precalculated value of said bandwidth expansion factor from a table containing a plurality of precalculated values.

8. An apparatus as claimed in claim 7, wherein said table includes values of said bandwidth expansion factor which are based on different variants of one or more parameter of transmission of data over said communication path.

9. An apparatus as claimed in claim 8, wherein said table includes at least one value of a bandwidth expansion factor for traffic containing a combination of different sizes of packets.

10. An apparatus as claimed in claim 6, further comprising means for providing said information to said determining means.

* * * * *